United States Patent [19]
Inada

[11] 3,893,694
[45] July 8, 1975

[54] HYDRAULIC PRESSURE ANTISKID CONTROL APPARATUS FOR A VEHICLE
[75] Inventor: Masami Inada, Toyoake, Japan
[73] Assignee: Aisin Seiki Co., Ltd., Japan
[22] Filed: Oct. 31, 1973
[21] Appl. No.: 411,439

[30] Foreign Application Priority Data
Oct. 31, 1972  Japan............................ 47-109053

[52] U.S. Cl............................ 303/21 F; 303/21 AF
[51] Int. Cl............................................ B60t 8/02
[58] Field of Search .......... 303/21 F, 21 AF, 61-63, 303/68-69, 10; 188/181 A

[56] References Cited
UNITED STATES PATENTS
| | | | |
|---|---|---|---|
| 3,671,085 | 6/1972 | Pasek et al. ........................ | 303/21 F |
| 3,694,038 | 9/1972 | Ingram et al. ...................... | 303/21 F |
| 3,741,612 | 6/1973 | Ando................................. | 303/21 F |

Primary Examiner—Trygve M. Blix
Assistant Examiner—Douglas C. Butler
Attorney, Agent, or Firm—Oblon, Fisher, Spivak, McClelland and Maier

[57] ABSTRACT

Hydraulic pressure antiskid control apparatus for a vehicle includes a pressure accumulator for supplying fluid pressure to a chamber for actuating a piston and valve disposed within the flow path between the vehicle master cylinder and the wheel cylinders, a changeover valve for alternatively connecting the chamber to the pressure accumulator and a reservoir, an electrocircuit for detecting wheel lock or skid conditions and actuating the changeover valve, a switch for detecting the presence of insufficient pressure of the accumulator, an emergency pressure accumulator, and a valve associated with the emergency pressure accumulator for permitting pressure therefrom to flow to the chamber.

11 Claims, 1 Drawing Figure

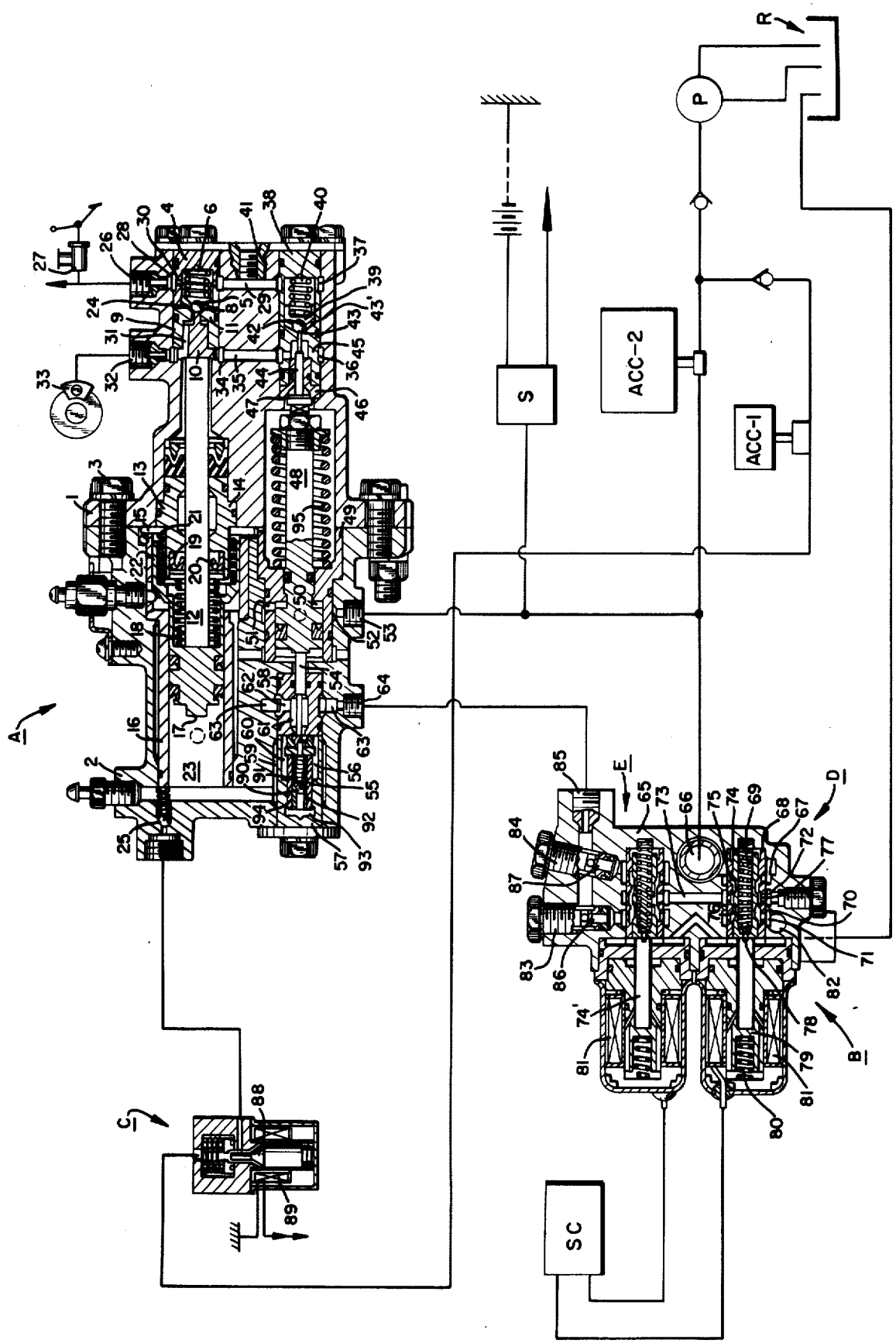

HYDRAULIC PRESSURE ANTISKID CONTROL APPARATUS FOR A VEHICLE

BACKGROUND OF THE INVENTION

1. Field of the Invention

The present invention relates generally to antiskid apparatus and more particularly to a hydraulic pressure antiskid control apparatus for a vehicle wherein a hydraulic pressure chamber, adapted for operating a piston so as to decrease the hydraulic braking pressure within a wheel cylinder, is connected to an emergency pressure accumulator and a pressure responsive valve which may be actuated by appropriately corresponding the actual hydraulic pressure to that required for antiskid control, when the antiskid operation is being performed.

2. Description of the Prior Art

Conventional antiskid braking systems have been provided with means such that safety during braking is ensured by forming an auxiliary path between the master cylinder and the wheel cylinders which includes a pressure accumulator which permits operation of the system under reduced pressure conditions so as to permit the antiskid control apparatus to function and prevent wheel lock from occurring. However, complete safety is not attained due to prolonged strokes attending the piston of the master cylinder.

SUMMARY OF THE INVENTION

Accordingly, it is an object of the present invention to provide an improved antiskid braking system for a vehicle.

Another object of the present invention is to provide a hydraulic pressure antiskid control apparatus for improving the safety during braking by providing the hydraulic pressure from an emergency pressure accumulator to a hydraulic pressure chamber for performance of the antiskid operation so as to prevent any increase in stroke of the piston of the master cylinder.

BRIEF DESCRIPTION OF THE DRAWINGS

Various other objects, features, and attendant advantages of the present invention will be more fully appreciated as the same becomes better understood from the following detailed description when considered in connection with the accompanying drawing, wherein:

The FIGURE is a schematic view, partly in section, of one embodiment of a hydraulic pressure antiskid control apparatus constructed according to the present invention and showing its cooperative parts.

DESCRIPTION OF A PREFERRED EMBODIMENT

Referring now to the drawing, a first housing section 1 is connected to a second housing section 2 by means of bolts 3 and a socket 4 is mounted within the upper right portion of the housing 1, a piston 5 being diposed therein and biased toward the left by means of a spring 6 so as to in turn bias a ball valve 8 toward the left. A partition 9 is interposed between socket 4 and an interior section of the housing 1, the left end of the partition being in contact with a flanged portion of the housing and being maintained in such position by means of the fastening devices securing socket 4 within housing 1. A transmission member 10 is disposed within a recess portion of partition 9, the right end of the transmission member 10 projecting through an aperture provided within partition 9 so as to contact the ball valve 8 which has a valve seat surface 11. The transmission member 10 may be pushed toward the right by means of a piston 12 so as to move the ball valve 8 toward the socket 4 and thereby unseat the same from surface 11. The piston 12 is actuated toward the right by means of hydraulic pressure.

A plug 13, partially disposed within both housings 1 and 2, annularly surrounds the piston 12 so as to permit the latter to be slidably passed therethrough. A flanged portion 14 disposed upon the outer peripheral surface of the plug 13 is seated within a counterbored portion of the first housing 1 and is retained therein by means of a ring 15. The ring 15 is in turn in contact with the right end portion of a stepped sleeve 16 and the left end portion of the sleeve 16 is in contact with the left wall portion of the second housing 2.

A piston 17 is slidably disposed within the sleeve 16 and is in abutment with the left end portion of piston 12 so as to actuate the same. A coil spring 18 surrounds the left end portion of piston 12 and is interposed between piston 17 and a retainer 20 of an annular seal member 19 of plug 13. Another coil spring 21 is similarly interposed between a flanged portion of another sleeve 22 and the ring 15, and consequently, as the left end portion of the sleeve 22 abuts a right, projecting portion of piston 17, the latter is always biased toward the left by means of two springs. However, the springs are biased and compressed toward the right due to hydraulic pressure acting upon piston 17 within a chamber 23, the movement of piston 17 serving in turn to actuate piston 12 and transmission member 10, the latter of which unseats the ball valve 8 from valve seat 11 against the biasing action of spring 6. The piston 5 has an aperture 24 which permits communication between the right chamber and the left chamber, and a check valve 25 disposed within the left portion of housing 2 is utilized for imparting hydraulic pressure therethrough and into the chamber 23. A radial port 26 is provided within the upper right portion of housing 1 and is adapted to be connected to a master cylinder 27. The port is connected through means of an annular groove 28 to a passageway 29 which is in turn connected to the control apparatus at the lower portion thereof, the annular groove 28 also being connected through means of an aperture 30 to the piston chamber of the socket 4.

In the condition shown in the FIGURE, the ball valve 8 is unseated from surface 11 whereby the hydraulic pressure of the master cylinder 27 may be transmitted from the port 26 through the annular groove 28 and the aperture 30, the piston chamber of socket 4, the communicating aperture 24, past the ball valve 8 and into a groove or passageway 31 of transmission member 10 and another radial port 32 to wheel cylinders 33 of the front wheels. The output hydraluic pressure of the master cylinder 27 is also transmitted to the rear wheels as shown by the arrow. Consequently, when the brake pedal 34' is depressed, the hydraulic pressure is transmitted through the appropriate passageways to the wheel cylinders 33. It should be noted that port 32 is connected to an annular groove 34 which surrounds partition 9 and which is connected to a passageway 35 which in turn is connected to the control apparatus. The lower portion of passageway 35 is similarly connected to an annular groove 36 while the lower portion of passageway 29 is similarly connected to an annular groove 37.

Within the lower right portion of housing section 1 and around which is disposed the annular grooves 36 and 37, there is provided a socket 38 within which is fitted a slidable piston 39 which is biased toward the left by means of a coil spring 40. The annular groove 37 is fluidically connected through means of a communicating aperture 41 with the piston chamber of socket 38 and the piston 39 also has an aperture 42 which serves to connect the piston chamber with a valve chamber located to the left of piston 39. The left side of piston 39 is maintained in contact with a ball valve 43 under the biasing action of spring 40, and the ball valve 43 is in turn in contact with a plunger 44 which is slidably disposed within a partition 45 and a sleeve 46 and which is also slidably passed through a plate 47 so as to be in contact with the right end of a piston 48. The ball valve 43 is provided with a valve seat 43' which is part of the partition 45 so as to appropriately terminate flow of hydraulic pressure, and the left end portion of piston 48 is slidably fitted within a stepped sleeve 49. The piston chamber 50 is fluidically connected, through means of an aperture 51 provided within sleeve 49 and an annular groove 52 provided within the housing 2, to a radial port 53 for permitting fluid communication with a pressure accumulator ACC-2. Under normal operations, the hydraulic pressure transmitted from the pressure accumulator to the chamber 50 serves to move the piston 48, against the biasing force of a spring 95 which annularly surrounds piston 48, toward the left so as to maintain such position.

The left end of piston 48 is in contact with a plunger 54 which in turn, is in contact with a valve 55, and a spring 56 is interposed between a flanged portion of the plunger 54 and a counterbored section of a socket 57, and consequently, the valve 55 is biased so as to have the right valve face thereof moved into contact with the valve seat of a sleeve 58 which surrounds plunger 54. An annular chamber 59 which surrounds the peripheral surface of socket 57 is fluidically connected to the upper left portion of the chamber 23 while being also connected through means of a port 60 formed within the wall of socket 57, to the valve chamber of socket 57. When the valve 55 is opened, although the valve is shown as being closed, the valve chamber is fluidically connected with another chamber 61 which is similarly connected, through means of a port 62 provided within the sleeve 58 and an annular groove 63 of the housing section 2 to a radial port 64 which in turn is further connected through means of a hydraulic pressure changeover valve, generally indicated by the reference character B, to the pressure accumulator ACC-2.

Referring now to the particular structure of the hydraulic pressure changeover valve B, an opening 66 within body 65 is fluidically connected with an annular groove 67 which is also connected to another annular groove 69 provided within tubular housing 68. An annular groove 70, which is similar to the annular groove 69, is also connected to another annular groove 71 which is also provided within a body 65. Still another annular groove 72 is interposed between annular grooves 67 and 71, and is connected to a fluid passageway 73, and within the tubular housing 68 is disposed a tubular piston 74, two annular grooves 75 and 76 being formed upon the outer peripheral surface of piston 74. A round 77 is formed between annular grooves 75 and 76 and the tubular piston 74 is biased toward the left by means of a spring 78. The left end of the tubular piston 74 is secured to the valve core 79 which is biased toward the right by means of a spring 80, the force of the spring 80 being less than that of the other spring 78, and a solenoid 81 annularly surrounds core 79. When solenoid 81 is excited, the tubular piston 74 is actuated toward the right by means of the core 79, whereupon the round 77 is shifted so as terminate communication between the annular grooves 72 and 69 and to establish communication between annular groove 70 and annular groove 72, and still further, hydraulic pressure from the pressure accumulator ACC-2 is able to be transmitted or terminated with respect to the passageway 73. During the termination phase, passageway 73 is connected, by means of a passageway 82, to a reservoir R whereby passageway 73 is able to be connected to the chamber within the upper left portion of the hydraulic pressure control apparatus, generally indicated by the reference character A. The control valve mechanism will now be illustrated.

With respect to the control valve mechanism, generally indicated by the reference character E, which is connected to the fluid passageway 73, as such mechanism is substantially the same as that of the control valve mechanism, generally indicated by the reference character D, a detailed description of the same will be omitted. Mechanism E includes passageways 83 and 84, and under the conditions illustrated, passageway 84 is fluidically connected to the passageway 73, but when a solenoid 81' is excited, the passageway 83 is connected to the passageway 73. In addition, both of the passageways 83 and 84 are respectively connected through means of a common port 85 to the port 64 of the hydraulic pressure control apparatus, generally indicated by the reference character A. A difference to be noted with respect to the passageways 83 and 84 is the difference in size of the adjustable apertures 86 and 87, and as a result of such, the operational speed of the hydraulic pressure control apparatus A is dependent thereon.

Continuing still further, an electromagnetic valve, generally indicated by the reference character C, comprises a solenoid 89 and a valve 88, whereupon the solenoid being excited, the valve is opened so as to transmit hydraulic pressure from the pressure accumulator ACC-1 to the chamber 23 of the hydraulic pressure control apparatus A. The pressure switch S is switched over in accordance with the hydraulic pressure of the pressure accumulator ACC-2 so as to operate the electromagnetic valve C. When the pressure of the chamber 23 is less than a predetermined pressure, the valve is opened so as to transmit hydraulic pressure from the pressure accumulator ACC-1 to the chamber 23. Moreover, an electrocircuit SC is operated in accordance with an input signal, received from the wheels of the vehicle so that the solenoids 81 and 81' of the changeover valve are excited and antiskid operation is attained. P of course designates a pump interposed between the accumulators ACC-1 and ACC-2 and the reservoir R. The operation of the apparatus constructed according to the present invention will now be described.

When the wheels are in normal operation without slippage during a braking operation, the hydraulic pressure is transmitted from the pressure accumulator ACC-2 through means of a conduit leading to port 53 of the hydraulic pressure control apparatus A and into chamber 50. The piston 48 is thereupon shifted toward the left by means of the pressure within the chamber 50, and the plunger 44 is also shifted toward the left so as to permit the ball valve 43 to be seated upon seat 43' and thereby terminate any fluid flow. Valve 43 is maintained in this condition so long as the pressure accumulator ACC-2 has sufficient pressure. On the other hand, hydraulic pressure from the pressure accumulator ACC-2 is provided from the opening 66 of the changeover valve B through means of the annular grooves 67, 69, 75 and 72, as well as passageway 73, the control valve mechanism E, and either of the ports 83 or 84 to the port 64 of the hydraulic pressure control apparatus A.

The hydraulic pressure is further transmitted through the annular groove 63 and the port 62 to the chamber 61 whereupon the valve 55, normally biased so as to prevent fluid flow from the chamber, is now actuated by means of piston 48 and plunger 54 so as to be shifted toward the left and be opened. The hydraulic pressure from the port 64 is thus able to be transmitted through the annular groove 59 and into the upper chamber 23 whereby the same acts upon the pistons 17 and 12 and member 10 so as to displace the ball valve 8 from the valve seat 11. Hence, it is seen that under normal braking operations performed during normal driving periods, the ball valve 8 of the hydraulic pressure control apparatus A is open while the ball valve 43 is closed. As a result, the braking hydraulic pressure of the master cylinder 27 is transmitted from the port 26 through the ball valve 8, and the port 32 to the brake wheel cylinders 33 so as to brake the vehicle.

During braking, if wheel lock should occur, the electrocircuit SC is operative such that the solenoid 81 of the changeover valve B is excited whereby the piston 74 is shifted toward the right by means of the control valve mechanisms D and E. Accordingly, the passageway 73 interposed between and connecting the control valve mechanisms D and E is fluidically connected to the passageway 82 and the reservoir R, and fluid flow to such passageway, from the pressure accumulator ACC-2, is terminated. On the other hand, the passageway 73 is connected through either of the ports 83 or 84 to the port 64 of the hydraulic pressure control apparatus A. Accordingly, chamber 23 of apparatus A is connected through means of the changeover valve B to the reservoir R whereupon a drop in pressure occurs which causes the piston 17 to be shifted toward the left under the biasing force of the spring 18 and the hydraulic pressure acting upon the piston 12. As piston 12 is shifted toward the left, the transmission member 10 is also moved toward the left thereby permitting the ball valve 8 to be seated, and since both ball valves 8 and 43 are closed, the hydraulic pressure associated with the master cylinder is not able to be transmitted to the wheel cylinders 33. Moreover, the piston 17 is able to be returned toward the left under the influence of any residual pressure within the wheel cylinders 33.

Accordingly, the hydraulic pressure associated with the wheel cylinders 33 is lowered so as to rectify the wheel lock conditions, and when the wheel lock conditions are rectified, the electrocircuit SC is again operated such that the solenoid 81 is in the non-excited condition and the control valve mechanism D is released to the condition shown in the FIGURE. As a result of such operation, the hydraulic pressure within the chamber 23 is restored and the piston 12 is once again returned toward the right direction, and the ball valve 8 is again unseated so as to permit the braking hydraulic pressure of the master cylinder 27 to be transmitted through the ball valve 8 to the wheel cylinders 33 so as to perform the braking operation. Similarly, the hydraulic pressure of the pressure accumulator ACC-2 is again transmitted to the chamber 23 as a result of the release of the control mechanism D, whereby the piston 12 is in fact actuated toward the right to the position shown in the FIGURE, and the antiskid operation is of course automatically performed by repetition of the above-mentioned operation in small, incremental steps.

If the predetermined hydraulic pressure within the pressure accumulator ACC-2 should become lost, due for example to accidental causes, the piston 48 of the hydraulic control apparatus A is retracted toward the right by means of a spring 95 annularly disposed therearound due to the pressure drop within chamber 50. As a result, ball valve 43 is unseated from the valve seat 43', and due to the return of piston 48, the plunger 54 and the valve 55 are also returned toward the right whereupon valve 55 is seated upon its valve seat as shown in the FIGURE so as to terminate the flow of fluid into or out of chamber 23 and also to retain the residual pressure therein. Such operation of course causes the pistons 17 and 12 to be retained in their positions before the hydraulic pressure drop, and when the brake pedal is depressed so as to initiate a braking operation, the brakes can in fact be actuated because both of the ball valves 8 and 43 are open so as to transmit hydraulic fluid between the master cylinder 27 and the wheel cylinders 33.

Under such conditions, the piston 12 is locked and cannot be shifted toward the left, and accordingly, the normal braking corresponding to the various pedal strokes can be obtained without any loss in the number of brake pedal strokes. Still further, when the hydraulic pressure within the pressure accumulator ACC-2 suddenly drops, such as when the ball valve 8 is seated and the piston 12 is shifted from the position shown in the FIGURE toward the left and the chamber 23 is connected to the reservoir during the occurrence of a skidding situation and the actuation of the antiskid apparatus, the lower piston 48 is shifted toward the right as a result of the reduced pressure within chamber 50 whereupon the closed ball valve 43 is now opened as shown in the FIGURE. The fluidic connection between the master cylinder 27 and the wheel cylinders 33 is thus maintained due to the opening of the valve, and therefore the system is able to be operated. However, piston 12 must be immediately returned toward the right at the moment the ball valve 43 opens, but as no hydraulic pressure is applied to chamber 23, piston 12 remains in the left position. As a result, the depression stroke of the brake pedal is prolonged corresponding to the displaced location of the piston 12 which leads to an unstable braking operation which is disadvantageous for safe driving.

In accordance with the present invention therefore, in order to prevent such disadvantages, a pressure responsive switch S is associated with the pressure accumulator ACC-2 so that the pressure drop may be detected and the electromagnetic valve C actuated such that hydraulic pressure may be transmitted from the emergency pressure accumulator ACC-1 through the check valve 25 and into chamber 23 so as to return the piston 12 toward the right whereby the sudden increase in the brake pedal stroke can be prevented and safety in the braking operation restored. It should also be noted that the safety valve 90 disposed within valve 55 is provided for discharging the pressure within the chamber 23 to the outside when the hydraulic pressure within chamber 23 exceeds the predetermined value, such as for example, when the atmospheric temperature is greatly increased.

The safety valve 90 is normally biased toward the valve seat 92 by means of a spring 91, the valve 90 serving to transmit hydraulic pressure having a force greater than the predetermined value of the force of spring 91, and being closed when the pressure is less than the force of spring 91. The interior of valve 55 is of course connected to chamber 23 through means of chamber 93, groove 94, and the port 60. Consequently, when an abnormal pressure increase is transmitted to chamber 23, the pressure may be transmitted through the valve 55 toward the right, through the chamber 61, the port 62, and the annular groove 63 to the port 64. It is preferable to utilize a signal switch which is responsible to a detected signal concerned with the movement of the piston 48 of the hydraulic pressure control apparatus A in lieu of the pressure responsive switch S, and it is also possible to use both the pressure responsive switch S and a movement responsive signal switch so as to supply hydraulic oil to the chamber 23 when both of the switches are actuated.

obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A hydraulic pressure antiskid control apparatus for a vehicle braking system having a master cylinder and slave wheel cylinders, comprising:
    a first pressure accumulator;
    a piston which is capable of being moved by hydraulic pressure from said pressure accumulator;
    means for accumulating repulsive energy responsive to said movement of said piston;
    first valve means operated by said piston for permitting or preventing the flow of hydraulic pressure for the braking operation;
    second valve means interposed between the vehicle master cylinder and the wheel cylinders;
    power piston means for receiving the hydraulic pressure within the flow path which includes said second valve means, upon one side thereof, and for receiving the hydraulic pressure of said pressure accumulator upon the other side thereof;
    chamber means for transmitting said hydraulic pressure from said pressure accumulator to said power piston means;
    changeover valve means for alternately connecting said chamber means to said pressure accumulator and a reservoir;
    third valve means operative with said piston for connecting said chamber means to said changeover valve;
    said changeover valve means being operative by electrocircuit means for detecting wheel lock conditions;
    means for detecting the failure of said power piston means to be moved in accordance with said hydraulic pressure;
    a second accumulator;
    fourth valve means responsive to said failure detecting means and for connecting said second pressure accumulator with said chamber means; and
    a safety valve within said chamber means.

2. Control apparatus as set forth in claim 1, wherein said changeover valve means and said fourth valve means are solenoid operated valves.

3. Control apparatus as set forth in claim 2, wherein said changeover valve means further comprises:
    a pair of solenoids for respectively actuating a pair of pistons;
    a first set of groove means provided upon the outer peripheral surfaces of said pair of pistons; and
    a second set of groove means provided within said changeover valve means for establishing a set of flow paths with said first set of groove means in accordance with excitation or non-excitation of said pair of solenoids.

4. A hydraulic pressure antiskid control apparatus for a vehicle braking system having a master cylinder and slave wheel cylinders, comprising:
    a first pressure accumulator;
    first valve means interposed within a flow path between the vehicle master cylinder and the wheel cylinders;
    power piston means for receiving the hydraulic pressure within the flow path which includes said first valve means, upon one side thereof and for receiving the hydraulic pressure of said pressure accumulator upon the other side thereof;
    chamber means for transmitting said hydraulic pressure from said pressure accumulator to said power piston means;
    changeover valve means for alternately connecting said chamber means to said pressure accumulator and a reservoir, said changeover valve means being operative by electrocircuit means for detecting wheel lock conditions;
    means for detecting failure of said hydraulic pressure for actuating said power piston means;
    a second pressure accumulator; and
    second valve means responsive to said failure detecting means and connecting said second pressure accumulator with said chamber means.

5. Control apparatus as set forth in claim 4, further comprising a piston capable of being moved by hydraulic pressure from said first pressure accumulator.

6. Control apparatus as set forth in claim 5, further comprising means for accumulating repulsive energy responsive to said movement of said piston.

7. Control apparatus as set forth in claim 6, further comprising third valve means operated by said piston for permitting or preventing the flow of hydraulic pressure for the braking operation.

8. Control apparatus as set forth in claim 7, further comprising fourth valve means operative with said piston for connecting said chamber means to said changeover valve means.

9. Control apparatus as set forth in claim 8, further comprising a safety valve within said chamber means.

10. Control apparatus as set forth in claim 9, further comprising a pressure source for supplying the fluid pressure to said first and second pressure accumulators.

11. Control apparatus as set forth in claim 10, wherein said changeover valve means and second valve means are solenoid operated valves.

* * * * *